(12) United States Patent
Mizumura

(10) Patent No.: US 12,557,603 B2
(45) Date of Patent: Feb. 17, 2026

(54) LASER REPAIR METHOD AND LASER REPAIR DEVICE

(71) Applicant: V TECHNOLOGY CO., LTD., Kanagawa (JP)

(72) Inventor: Michinobu Mizumura, Kanagawa (JP)

(73) Assignee: V TECHNOLOGY CO., LTD., Kanagawa (JP)

( * ) Notice: Subject to any disclaimer, the term of this patent is extended or adjusted under 35 U.S.C. 154(b) by 622 days.

(21) Appl. No.: 17/617,748

(22) PCT Filed: May 27, 2020

(86) PCT No.: PCT/JP2020/020967
§ 371 (c)(1),
(2) Date: Dec. 9, 2021

(87) PCT Pub. No.: WO2020/250685
PCT Pub. Date: Dec. 17, 2020

(65) Prior Publication Data
US 2022/0238396 A1 Jul. 28, 2022

(30) Foreign Application Priority Data
Jun. 13, 2019 (JP) .................. 2019-110482

(51) Int. Cl.
*H01L 21/66* (2006.01)
*B23K 26/03* (2006.01)
(Continued)

(52) U.S. Cl.
CPC ............ *H01L 22/22* (2013.01); *B23K 26/032* (2013.01); *B23K 26/53* (2015.10); *G01N 21/27* (2013.01);
(Continued)

(58) Field of Classification Search
CPC ... G02B 5/288; H01L 29/66742; H01L 22/22; H04N 25/6153
See application file for complete search history.

(56) References Cited

U.S. PATENT DOCUMENTS

| 6,046,429 A | 4/2000 | Datta |
| 2010/0100356 A1 | 4/2010 | Tsutsui |

(Continued)

FOREIGN PATENT DOCUMENTS

| CN | 101726951 A | 6/2010 |
| CN | 109460782 A | 3/2019 |

(Continued)

OTHER PUBLICATIONS

Office Action issued in the counterpart Japanese Patent Application No. 2019-110482, mailed Apr. 11, 2023 (6 pages).
(Continued)

*Primary Examiner* — Robert S Walters, Jr.
*Assistant Examiner* — Andrew J Bowman
(74) *Attorney, Agent, or Firm* — Osha Bergman Watanabe & Burton LLP

(57) ABSTRACT

A laser repair method includes a repair process of performing repair work by setting a laser radiation range for a defect part in a multi-layer film substrate and irradiating the defect part with a laser beam under set laser working conditions. In the repair process, spectrum data of the defect part is acquired, and the laser working conditions of the laser beam, with which the defect part is to be irradiated, are set using a neural network after learning on the basis of the spectrum data, and the neural network has undergone machine learning using, as learning data, measurement data including multi-layer film structure data, spectrum data of each multi-layer film structure, and laser working experimental data of each multi-layer film structure.

2 Claims, 9 Drawing Sheets

(51) Int. Cl.
  *B23K 26/53* (2014.01)
  *G01N 21/27* (2006.01)
  *G06N 3/08* (2023.01)
  *G06T 7/00* (2017.01)

(52) U.S. Cl.
  CPC .............. *G06N 3/08* (2013.01); *G06T 7/001* (2013.01); *G06T 2207/10056* (2013.01); *G06T 2207/20081* (2013.01); *G06T 2207/20084* (2013.01); *G06T 2207/30148* (2013.01)

(56) References Cited

U.S. PATENT DOCUMENTS

| | | | | |
|---|---|---|---|---|
| 2011/0122283 | A1* | 5/2011 | Nagata | H04N 25/6153 348/E9.051 |
| 2016/0133751 | A1* | 5/2016 | Nomura | H01L 29/66742 257/43 |
| 2017/0270434 | A1 | 9/2017 | Takigawa et al. | |
| 2018/0260712 | A1 | 9/2018 | Hatada | |
| 2019/0099833 | A1 | 4/2019 | Keen | |

FOREIGN PATENT DOCUMENTS

| | | | |
|---|---|---|---|
| JP | H0896136 | A | 4/1996 |
| JP | H10-235490 | A | 9/1998 |
| JP | 2007-520874 | A | 7/2007 |
| JP | 2008-085279 | A | 4/2008 |
| JP | 2008188638 | A * | 8/2008 |
| JP | 2016-528496 | A | 9/2016 |
| KR | 2014-0012340 | A | 2/2014 |
| TW | 200632639 | A | 9/2006 |
| TW | 201315560 | A | 4/2013 |

OTHER PUBLICATIONS

International Search Report issued in corrresponding International Application No. PCT/JP2020/020967 mailed Jul. 28, 2020 (6 pages).
Written Opinion issued in corrresponding International Application No. PCT/JP2020/020967 mailed Jul. 28, 2020 (6 bages).
Notice of Allowance issued in corresponding Taiwanese Patent Application No. 109119442 dated Sep. 19, 2023 (8 pages).
Notice of First Examination Opinion issued in corresponding Chinese Patent Application No. 202080042211.5, dated Dec. 4, 2023.
Office Action issued in corresponding Korean Patent Application No. 10-2021-7040532, mailed Jul. 15, 2024 (8 pages).

* cited by examiner

LASER REPAIR METHOD AND LASER REPAIR DEVICE

TECHNICAL FIELD

The present invention relates to a laser repair method and a laser repair device.

BACKGROUND ART

Laser repair is performed after an inspection process in a manufacturing process of a flat panel display (FPD) or the like to perform repair work on a multi-layer film substrate, such as a thin film transistor (TFT), as a target by irradiating a defect part identified in the inspection process with a laser beam. The laser repair is typically performed through manual operations of highly skilled operators since the shape of the defect part that is a target of work differs for each defect part and it is necessary to change working conditions and the like for each defect part.

Meanwhile, automation of a part of the repair process through the use of an image processing technique has been proposed. According to a technique in the related art, a defect image obtained by imaging an inspection target area is collated with a reference image with no defect to detect a defect part, and designation and the like of a work position and a work range, which are to be irradiated with the laser beam, are performed for the detected defect on the basis of content of an input command (see PTL 1 below, for example).

CITATION LIST

Patent Literature

[PTL 1] Japanese Patent Application Publication No. 2008-188638

SUMMARY OF INVENTION

Technical Problem

In a case in which laser repair is performed on a multi-layer film substrate as a target through manual operations, it is necessary to work only on a defect part without damaging a peripheral layer or an underlayer of the defect part. Operators recognize the defect part identified in the inspection process and a layer structure in the surroundings thereof, define a necessary minimum work range on the basis of their experience, and perform the operations while appropriately selecting working conditions (a laser work recipe) on the basis of information regarding the recognized layer structure. Therefore, the operations inevitably take a long time, and skills of the operators also affect repair quality.

Also, in a case in which a part of the repair process is automated through the use of the image processing technique as in the technique in the related art, it is not possible to obtain the information regarding the defect part and the layer structure in the surroundings thereof merely from a two-dimensional image of the surface, and a work process is thus performed under constant working conditions even when there are differences in an underlayer or variations in a layer thickness. Therefore, there may be a problem that the work is insufficiently performed, or the work is excessively performed, and this leads to a failure of the repair, or to inability of performing satisfactory repair.

The present invention was proposed to address such circumstances. In other words, objects of the present invention are to enable automation of laser repair to improve operation efficiency, to enable acquisition of constant repair quality independently of an operator's skill, to enable satisfactory repair even in a case in which there are differences in an underlayer or variations in a film thickness, and the like.

Solution to Problem

In order to solve such a problem, the present invention includes the following configurations.

There is provided a laser repair method including: a repair process of performing repair work by setting a laser radiation range for a defect part in a multi-layer film substrate and irradiating the defect part with a laser beam under set laser working conditions, in which, in the repair process, spectrum data of the defect part is acquired, and the laser working conditions of the laser beam, with which the defect part is to be irradiated, are set using a neural network after learning on the basis of the spectrum data, and the neural network has undergone machine learning using, as learning data, measurement data including multi-layer film structure data, spectrum data of each multi-layer film structure, and laser working experimental data of each multi-layer film structure.

There is provided a laser repair device including: a repair work part that performs repair work by setting a laser radiation range for a defect part in a multi-layer film substrate and irradiating the defect part with a laser beam under set laser working conditions, in which the repair work part is adapted to acquire spectrum data of the defect part and set the laser working conditions of the laser beam, with which the defect part is to be irradiated, using a neural network after learning on the basis of the spectrum data, and the neural network has undergone machine learning using, as learning data, measurement data including multi-layer film structure data, spectrum data of each multi-layer film structure, and laser working experimental data of each multi-layer film structure.

DESCRIPTION OF EMBODIMENTS

Hereinafter, embodiments of the present invention will be described with reference to the drawings. In the following description, the same reference signs in different drawings represent portions with the same functions, and overlapping explanation in each drawing will appropriately be omitted.

Figure 1:
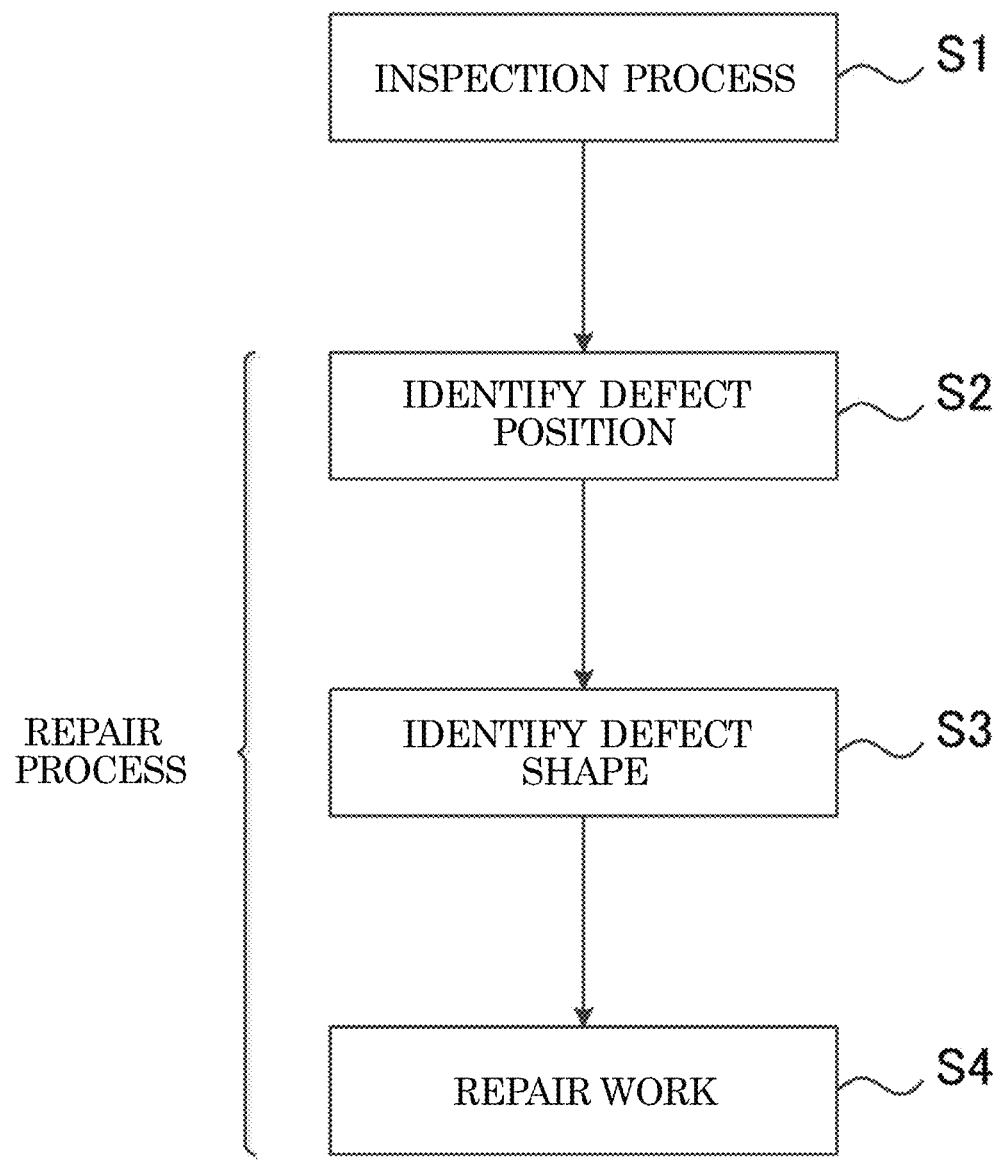
FIG. 1 is an explanatory diagram for explaining processes in a laser repair method.

A laser repair method according to an embodiment of the present invention is for a multi-layer film substrate such as a thin film transistor (TFT) and is adapted to perform repair work on a defect part by irradiating a surface thereof with a laser beam. As illustrated in FIG. 1, a repair process is performed after an inspection process S1 and includes a defect position identifying process S2, a defect shape identifying process S3, and a repair work process S4.

Figure 2:
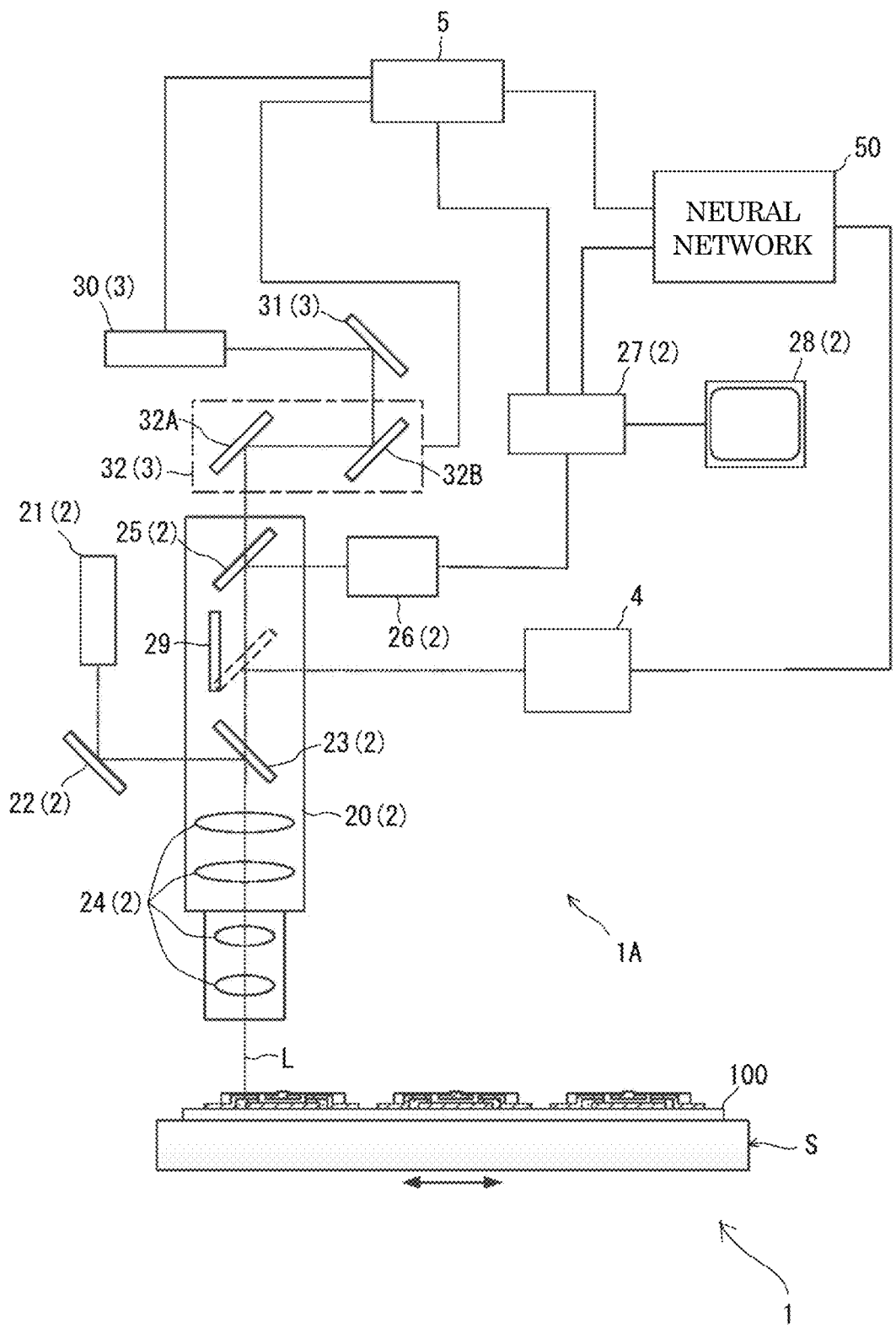
FIG. 2 is an explanatory diagram illustrating a configuration example of a laser repair device.

FIG. 2 illustrates an example of a laser repair device for executing the aforementioned repair process. A laser repair device 1 includes a repair work part 1A that irradiates a surface of a multi-layer film substrate 100 placed on a stage S moving in a horizontal plane with a laser beam L, and the repair work part 1A is provided with an image acquiring part 2, a laser radiation part 3, a spectral camera 4, a laser control part 5, and the like.

The image acquiring part 2 includes, for example, a microscope 20, a white light source 21, an imaging camera 26, and the like, is adapted to acquire a surface image of the multi-layer film substrate 100 via the microscope 20, and acquires a defect part image in a case in which there is a defect part in the multi-layer film substrate 100. The surface of the multi-layer film substrate 100 is irradiated with white incident light from the white light source 21 via a mirror 22, a half mirror 23, and a lens system 24, and light reflected by the surface of the multi-layer film substrate 100 forms an image on an image plane of the imaging camera 26 via the lens system 24, the half mirror 23, and a half mirror 25. The image captured by the imaging camera 26 is subjected to appropriate image processing by an image processing part 27 and is displayed as an image enlarged at an appropriate magnification on a display device 28.

The laser radiation part 3 includes, for example, a laser beam source 30, a laser scanner 32, and the like and is adapted to irradiate the surface of the multi-layer film substrate 100 with the laser beam L through the microscope 20. The laser beam emitted from the laser beam source 30 is incident on the microscope 20 via the laser scanner 32 configured with a mirror 31 and galvanometer mirrors 32A and 32B and is used to irradiate the surface of the multi-layer film substrate 100 through an optical system in the microscope 20.

The spectral camera 4 is adapted to acquire a spectral image of the surface of the multi-layer film substrate 100. The surface of the multi-layer film substrate 100 is irradiated with white incident light that has been emitted from the white light source 21 and is coaxial with the microscope 20, and reflected light from the surface is reflected by a mirror 29 inserted into an optical axis of the microscope 20 and is then incident on the spectral camera 4. The spectral camera 4 separates the reflected light from the surface of the multi-layer film substrate 100 and acquires spectrum data of each pixel of the spectral image.

Here, an optical axis of the laser beam L in the microscope 20, an optical axis of the image acquiring part 2 in the microscope 20, and an optical axis of the spectral camera 4 in the microscope 20 are coaxial. In this manner, it is possible to constantly set the position of the irradiation with the laser beam L in a monitor screen of the display device 28 and to obtain a monitor image of the display device 28 and a spectral image of the spectral camera 4 as coaxial images.

Figure 3:
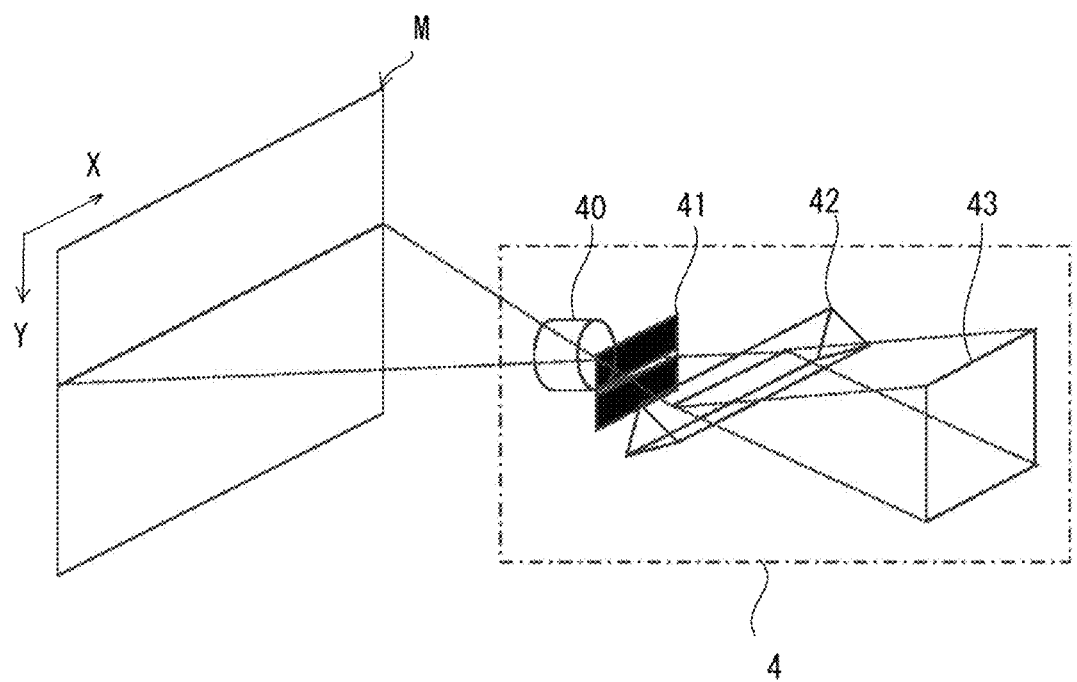
FIG. 3 is an explanatory diagram illustrating a configuration example and a function of a spectral camera.
Figure 3:
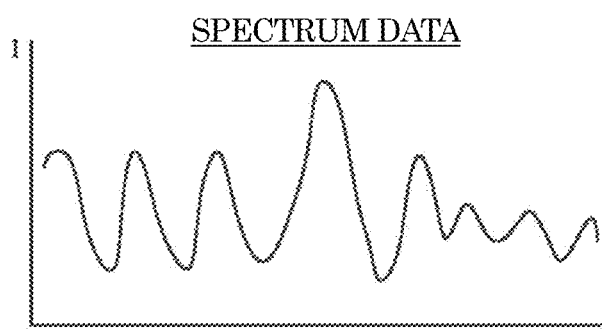
Figure 3:
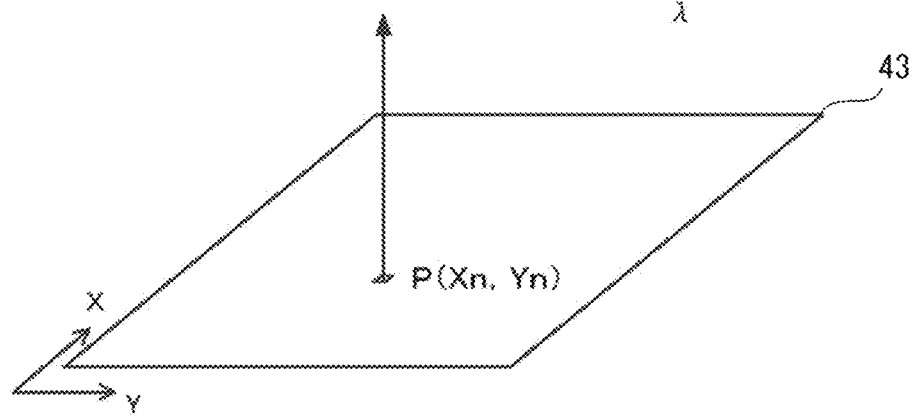

The spectral camera 4 includes, for example, a lens 40, a slit 41, a spectroscope 42, and a two-dimensional sensor 43 as illustrated in FIG. 3, separates reflected light corresponding to one line in an X direction in a measurement target surface M into light in a vertical direction thereof by a line spectral method, and detects space information in the X direction and spectral data thereof using the two-dimensional sensor 43. Also, one item of spectrum data is obtained for each one pixel (Xn, Yn) of resolution of the two-dimensional sensor 43 in an X-Y direction through scanning with reflected light corresponding to one line in a Y direction as needed.

The laser control part 5 performs control for setting a laser radiation range on a surface of the multi-layer film substrate 100 including the defect part and irradiating the defect part with a laser beam under set laser working conditions. The laser control part 5 is controlled in accordance with setting of a neural network 50 after learning. Spectrum data of each pixel of the spectral image acquired by the spectral camera 4 is input to the neural network 50, and the neural network 50 sets laser working conditions of the laser beam with which the defect part is to be irradiated for each pixel of the spectral image on the basis of the input spectrum data.

Figure 4:
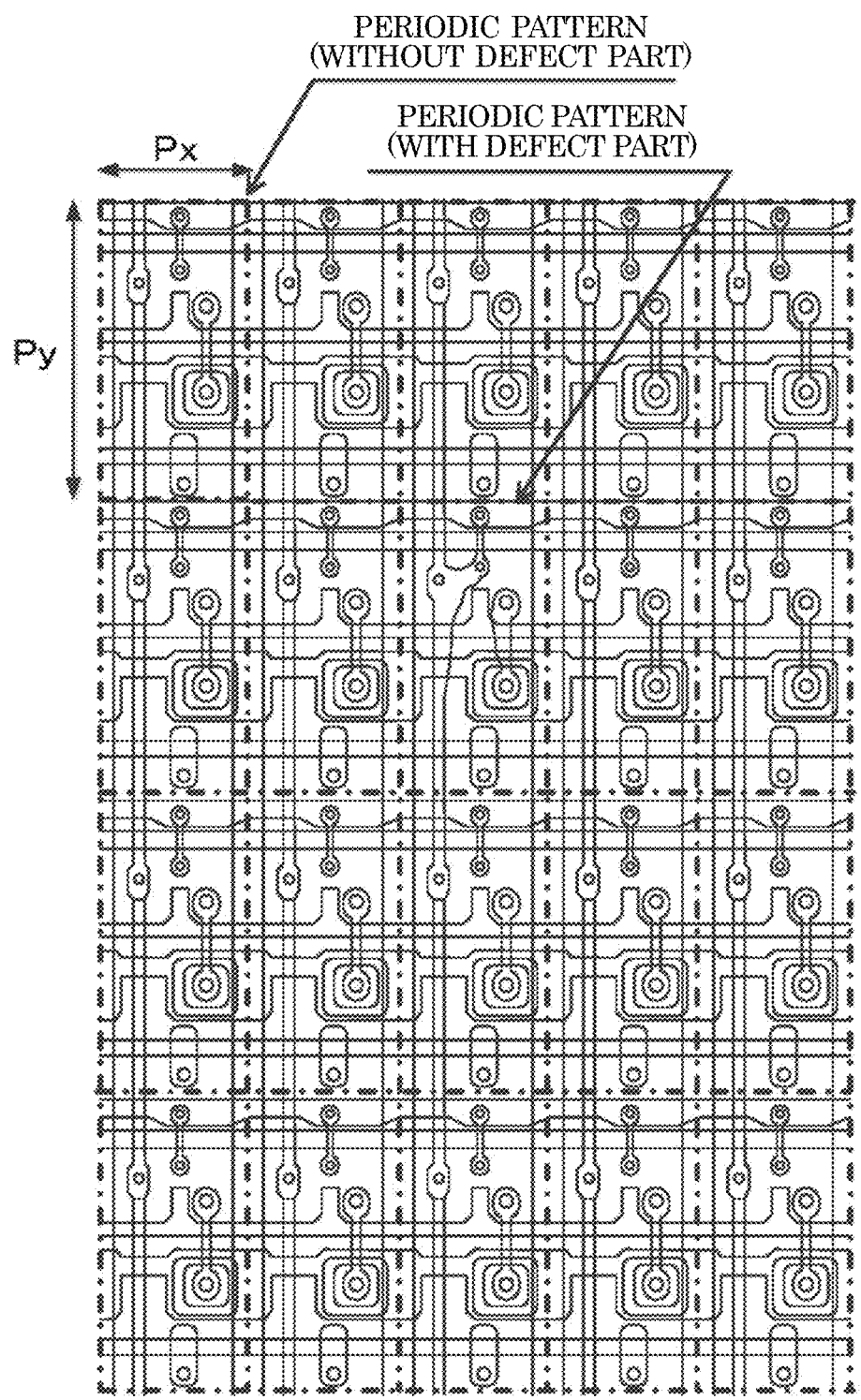
FIG. 4 is an explanatory diagram illustrating an example of a periodic pattern in a surface of a multi-layer film substrate.

The repair process (the defect position identifying process S2, the defect shape identifying process S3, and the repair process S4) using the laser repair device 1 will be specifically described. The multi-layer film substrate 100 that is a target of repair here has a two-dimensional periodic pattern including a periodic pitch Px in the X direction and a periodic pitch Py in the Y direction that perpendicularly intersects the periodic pitch Px as illustrated in FIG. 4. The periodic pattern corresponds to a multi-layer film structure pattern in one display pixel in a case in which the multi-layer film substrate 100 is a TFT substrate for an FPD.

First, in the defect position identifying process S2, the position of the defect part is identified from a result of the inspection process S1 performed prior to the repair process. At this time, an enlarged image acquired by the image acquiring part 2 is set to a low magnification, an image including a plurality of periodic patterns is acquired, and this is subjected to image processing using the image processing part 27 to thereby identify the aforementioned periodic pitches (Px, Py) and then identify the position of the periodic pattern where the defect part is present. Then, the optical axis of the microscope 20 is adjusted to the identified position, a magnification of enlargement is increased such that the shape of the defect part can be monitored, and an enlarged image centered on the defect part is thus obtained.

In the defect shape identifying process S3, the shape of the defect part is identified using the enlarged image centered on the defect part. At this time, the shape of the defect part is identified by the image processing part 27 comparing the periodic pattern image including the defect part with a periodic pattern image that does not include the defect part.

Figure 5:
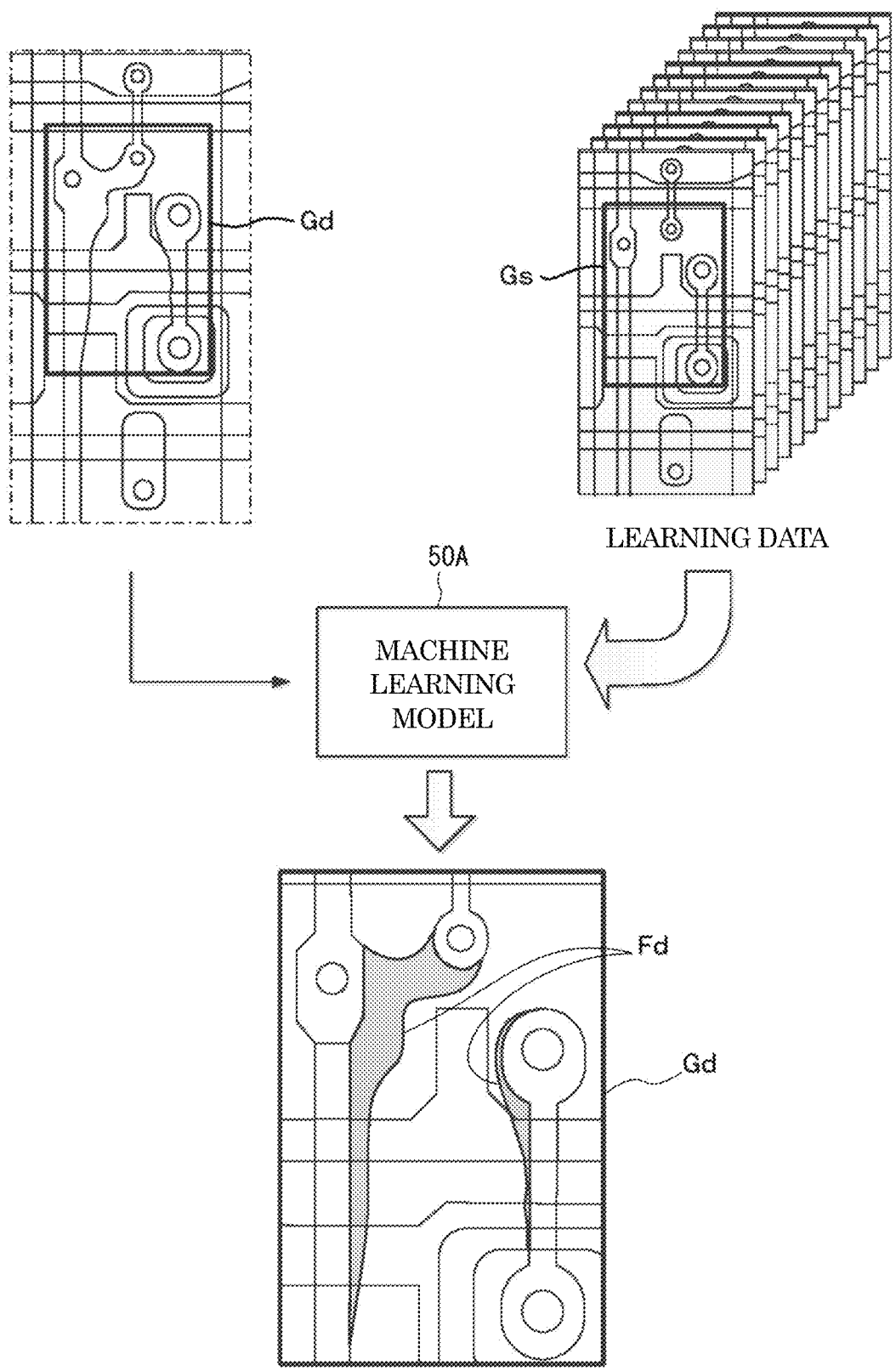
FIG. 5 is an explanatory diagram for explaining a defect shape identifying process.

The neural network 50 can be used in the identification of the shape of the defect part as well. Specifically, a periodic pattern image (an enlarged image centered on the defect part) Gd including the defect part is input to a machine learning model 50A after learning in the neural network 50, and the image processing part 27 identifies a shape Fd of the defect part from a periodic pattern image Gs including the defect part on the basis of an output of the machine learning model 50A, as illustrated in FIG. 5.

Not all the periodic patterns are formed to have the same shape, and the periodic patterns include errors of the pattern shapes. Therefore, it is difficult to accurately identify the shape of the defect part only from simple comparison of the images. It is possible to enhance accuracy of the identification of the shape of the defect part using the machine learning model 50A after learning in the neural network 50. The machine learning model 50A uses, as learning data, multiple periodic pattern images Gs acquired using test substrates of the multi-layer film substrate 100 that is the target of the repair.

Figure 6:
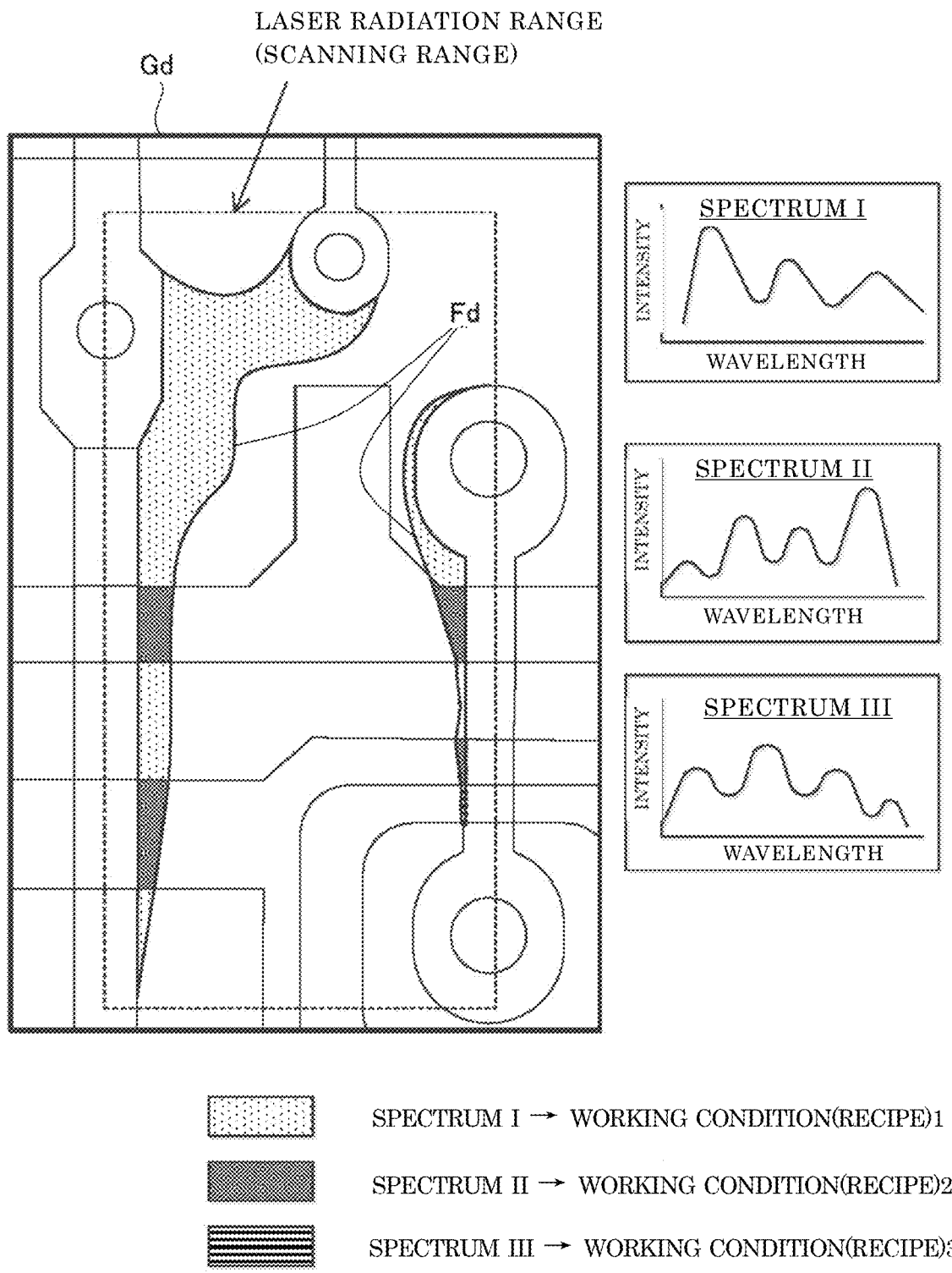
FIG. 6 is an explanatory diagram for explaining a repair work process.

In the repair work process S4, first, the laser control part 5 sets the laser radiation range as illustrated in FIG. 6 to include the shape of the defect part identified by the image processing part 27. The laser radiation range is a scanning range of the laser scanner 32, and in a case in which there are shapes Fd of defect parts at a plurality of separate locations, the scanning range is set to include all the locations.

Then, in the repair work process S4, spectrum data of each pixel of the defect part image acquired by the spectral camera 4 is input to the neural network 50 and the neural network 50 categorizes the input spectrum data, sections regions of the defect part image in accordance with the categories, and sets laser working conditions (a laser work recipe) for each of the sectioned regions.

In the example illustrated in FIG. 6, the defect part image with the shape Fd is sectioned into regions where the spectrum belongs to a category I, regions of a category II, and regions of a category III. A working condition 1 is set for the regions where the spectrum belongs to the category I, a working condition 2 is set for the regions where the spectrum belongs to the category II, and a working condition 3 is set for the regions where the spectrum belongs to the category III.

Figure 7:
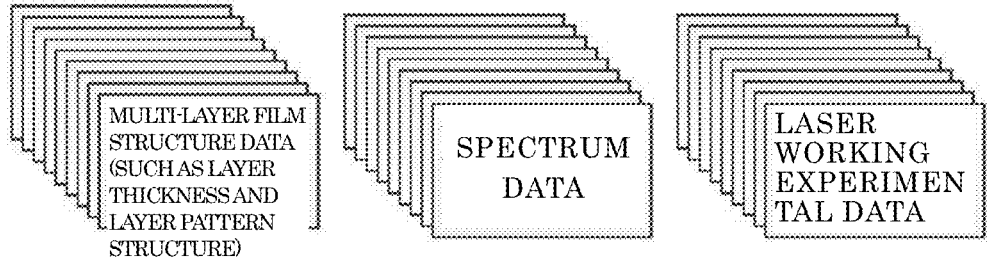
FIG. 7 is an explanatory diagram illustrating learning and operations of a neural network.
Figure 7:
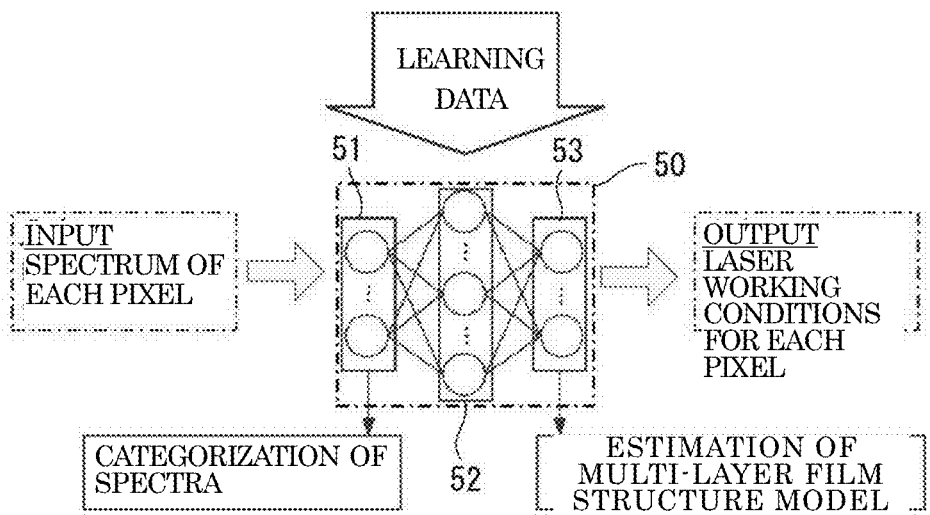
Figure 7:
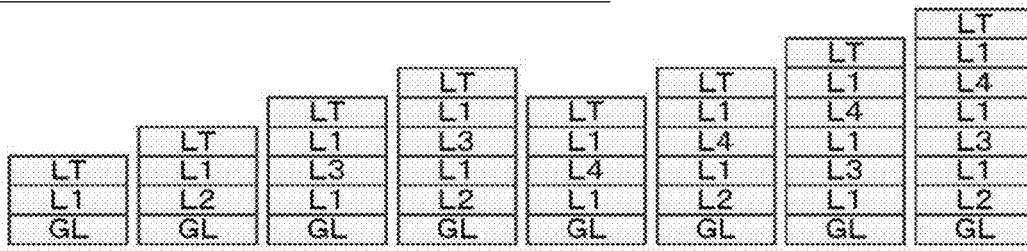

As illustrated in FIG. 7, spectrum data of each pixel at the position of the irradiation with the laser beam in the defect part image is input to the neural network 50 after learning, and laser working conditions for each pixel of the defect part image are output from the neural network 50 after learning. The neural network 50 after learning has an input layer 51, an intermediate layer 52, and an output layer 53, the input spectra are categorized by the input layer 51, and estimation of a multi-layer film structure model is performed by the output layer 53.

In the multi-layer film structure model, models 1 to 8 as illustrated in FIG. 7 are set in advance in one example. Here, the eight models (models 1 to 8) that are present as a multi-layer film structure are set as a combination of lamination of a substrate layer GL which is the lowermost layer, a first layer L1, a second layer L2, a third layer L3, and a fourth layer L4 which are laminated at intermediate locations, and a work target layer LT which is the uppermost layer. Such a multi-layer film structure model is appropriately set in accordance with the type of the multi-layer film substrate 100 that is the target of repair.

Learning data for causing the neural network 50 to perform learning is measurement data obtained using test substrates with the same multi-layer film structure as that of the multi-layer film substrate 100 that is the target of repair as illustrated in FIG. 7. The measurement data is multi-layer film structure data (such as a film thickness of each layer pattern of the multi-layer film), spectrum data of each multi-layer film structure (spectrum data of each pixel in the defect part image with the periodic pattern), laser working experimental data of each multi-layer film structure (a laser work recipe for when the work target layer is removed through irradiation with a laser), and the like, and these are measured in advance for each of periodic patterns of the multiple test substrates.

Figure 8:
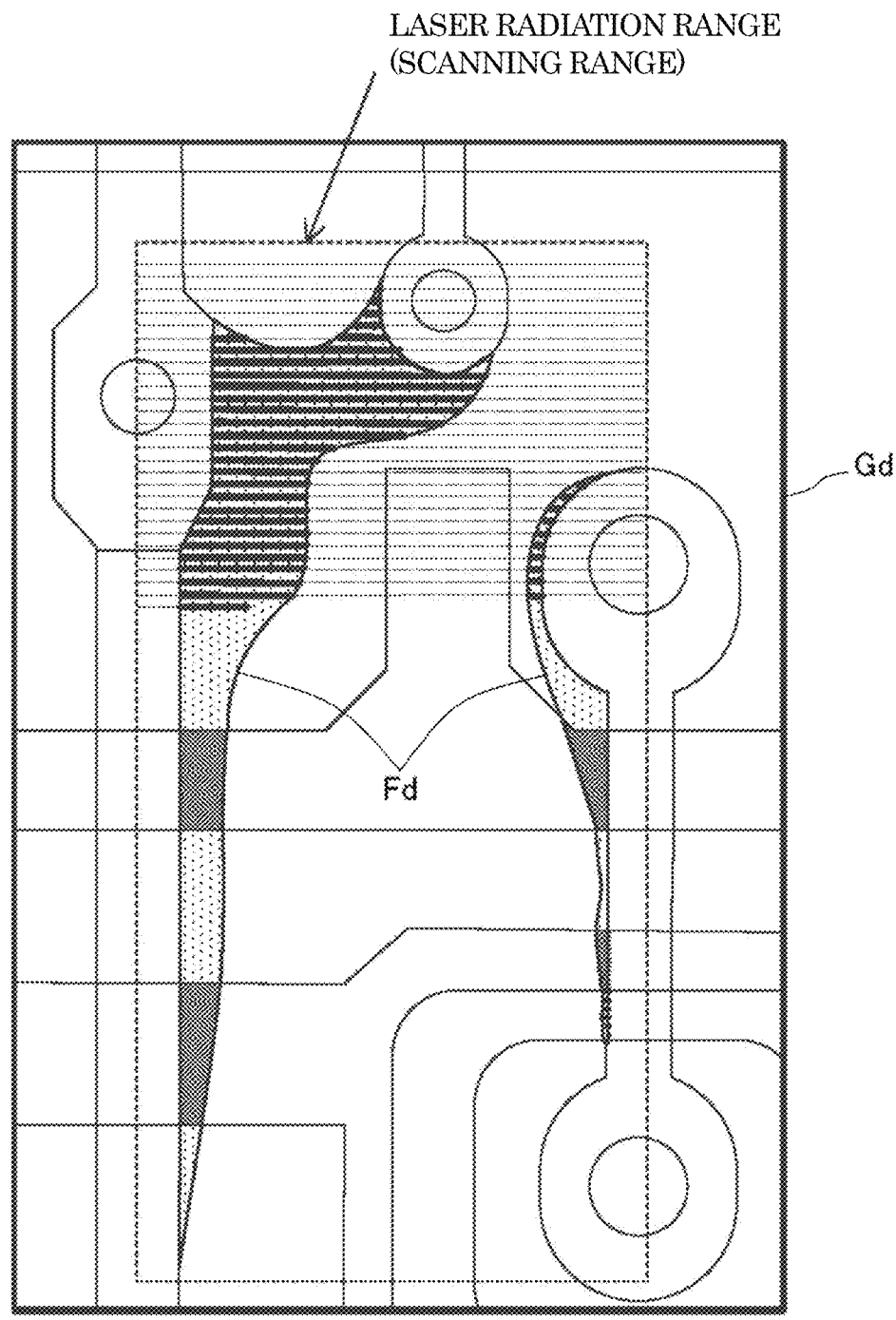
FIG. 8 is an explanatory diagram for explaining laser scanning in the repair work process.

As illustrated in FIG. 8, in regard to execution of the repair in the repair work process S4, raster scanning within the laser radiation range (scanning range) is performed by the laser scanner 32, and only in a case in which the scanning position of lateral scanning is located in the shape Fd of the defect part, an output of the laser beam is turned on as illustrated by the thick line, and the work is then performed there under the working conditions set in advance for each pixel of the defect part image. In a case in which the scanning position is located out of the defect part, the output of the laser beam is turned off (or reduced) as illustrated by the dashed line.

Figure 9:
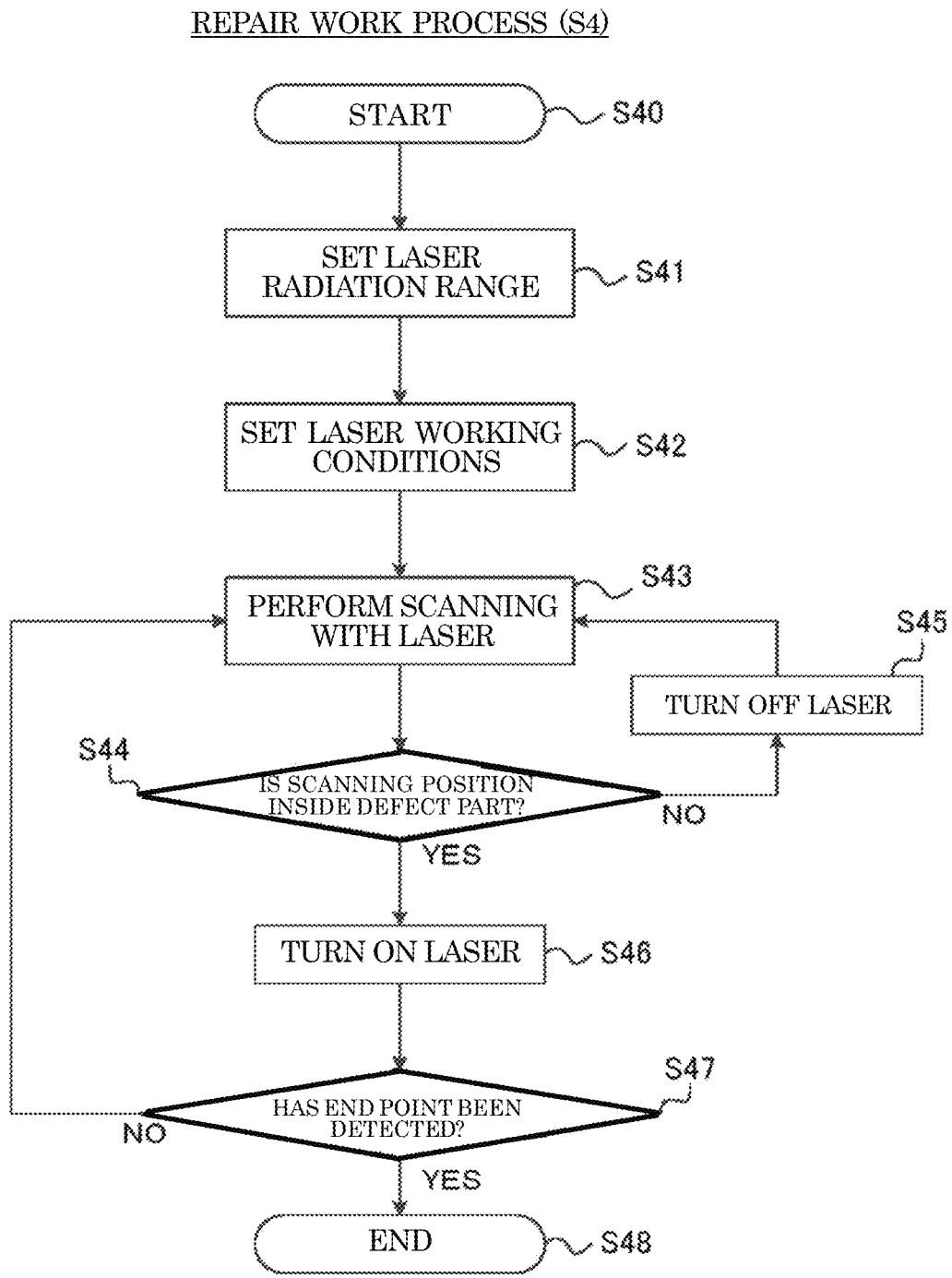
FIG. 9 is an explanatory diagram illustrating an operation flow of a laser control part in the repair work process.

Operations of the laser control part 5 in the repair work process S4 will be described with reference to FIG. 9. Once the operations are started (S40), the laser radiation range is set for the defect part (S41), and further, laser working conditions are set for each pixel of the defect part image (S42) as illustrated in FIG. 6. In the setting, the inside of the shape Fd of the defect part is sectioned for each laser working condition in advance as illustrated in FIG. 6.

Thereafter, once laser scanning is started (S43), whether or not the scanning position (the position of the irradiation with the laser beam) is in the defect part is determined (S44), and the laser beam is turned off (S45) in a case in which the scanning position is out of the defect part (S44: NO), or the laser beam is turned on (S46) if the scanning position is in the defect part (S44: YES). At this time, the irradiation with the laser beam is performed under the laser working conditions set in advance. Such laser scanning (S43) is continued until an end point is detected (S47: NO). Then, in a case in which the repair work for the defect part has ended, and the end point has been detected (S47: YES), the operations of the laser control part 5 are ended (S48).

According to the laser repair method using such a laser repair device 1, it is possible to recognize the multi-layer film structure of the multi-layer film substrate 100 that is a target of repair, then to extract a defect part, and to irradiate only the defect part with a laser beam under appropriate working conditions. Also, such repair work can be automatically performed. In this manner, it is possible to improve operation efficiency as compared with operator's manual operations and to obtain constant repair quality independently of an operator's skill. Also, even in a case in which there are differences in an underlayer of the work target layer or variations in a film thickness of the multi-layer film structure, it is possible to appropriately perform repair work only on the defect part without damaging the peripheral layer or the underlayer of the defect part in the automation of the laser repair.

Although embodiments of the present invention have been described in detail with reference to the drawings, specific configurations are not limited to the embodiments, and modifications and the like in design without departing from the gist of the present invention are also included in the present invention. Also, the aforementioned embodiments can be combined by applying the techniques to one another as long as there are no particular conflicts or problems in purposes, configurations, and the like.

REFERENCE SIGNS LIST

1 Laser repair device
1A Repair work part
2 Image acquiring part
20 Microscope
21 White light source
22, 29, 31 Mirror
23, 25 Half mirror
24 Lens system
26 Imaging camera 27 Image processing part
28 Display device
3 Laser radiation part
30 Laser beam source
32 Laser scanner
32A, 32B Galvanometer mirror
4 Spectral camera
40 Lens
41 Slit
42 Spectroscope
43 Two-dimensional sensor
5 Laser control part
50 Neural network
50A Machine learning model
51 Input layer
52 Intermediate layer
53 Output layer
100 Multi-layer film substrate
S Stage
L Laser beam

What is claimed is:

1. A laser repair method for a multi-layer film substrate, comprising:
acquiring, via a microscope, a defect part image of a defect part in a multi-layer film substrate having a two-dimensional periodic pattern;
acquiring an enlarged image centered on the defect part image by adjusting an optical axis of the microscope to a position of a periodic pattern image including the defect part in the defect part image, and setting a laser radiation range to include a shape of the defect part identified in the enlarged image;
irradiating, via a microscope, the laser radiation range with a laser beam;
acquiring spectrum data of the defect part by irradiating the multi-layer film substrate with white incident light that is coaxial with the microscope and separating reflected light from the multi-layer film substrate; and
based on the spectrum data, setting laser working conditions of the laser beam, with which the defect part is to be irradiated, using a neural network after learning based on the spectrum data, and performing repair work by irradiating the laser radiation range with the laser beam under the laser working conditions, wherein
the neural network has undergone machine learning using, as learning data, measurement data including multi-layer film structure data, spectrum data of each multi-layer film structure, and laser working experimental data of each multi-layer film structure,
the spectrum data is acquired for each pixel of the detect part image, and the laser working conditions are set for each pixel at a laser scanning position in the defect part image, and
the shape of the defect part is identified by a machine learning model after learning based on the periodic pattern image including the defect part, and the machine learning model has learned, as learning data, a periodic pattern image of the multi-layer film substrate.

2. A laser repair device for a multi-layer film substrate, comprising:
an image acquiring part that acquires, via a microscope, a defect part image of a defect part in a multi-layer film substrate having a two-dimensional periodic pattern;
a laser control part that:
acquires an enlarged image centered on the defect part image by adjusting an optical axis of the microscope to a position of a periodic pattern image including the defect part in the defect part image, and
sets a laser radiation range to include a shape of the defect part identified in the enlarged image;
a laser radiation part that irradiates, via a microscope, the laser radiation range with a laser beam; and
a spectral camera that acquires spectrum data of the defect part by irradiating the multi-layer film substrate with white incident light that is coaxial with the microscope and separating reflected light from the multi-layer film substrate, wherein
the laser control part:
based on the spectrum data, sets laser working conditions of the laser beam, with which the defect part is to be irradiated, using a neural network after learning based on the spectrum data, and performs repair work by causing the laser radiation part to irradiate the laser radiation range with the laser beam under the laser working conditions, and
the neural network has undergone machine learning using, as learning data, measurement data including multi-layer film structure data, spectrum data of each multi-layer film structure, and laser working experimental data of each multi-layer film structure.

* * * * *